Feb. 25, 1941.   R. L. MELTON ET AL   2,233,176
MANUFACTURE OF BONDED ABRASIVE ARTICLES
Filed March 28, 1940
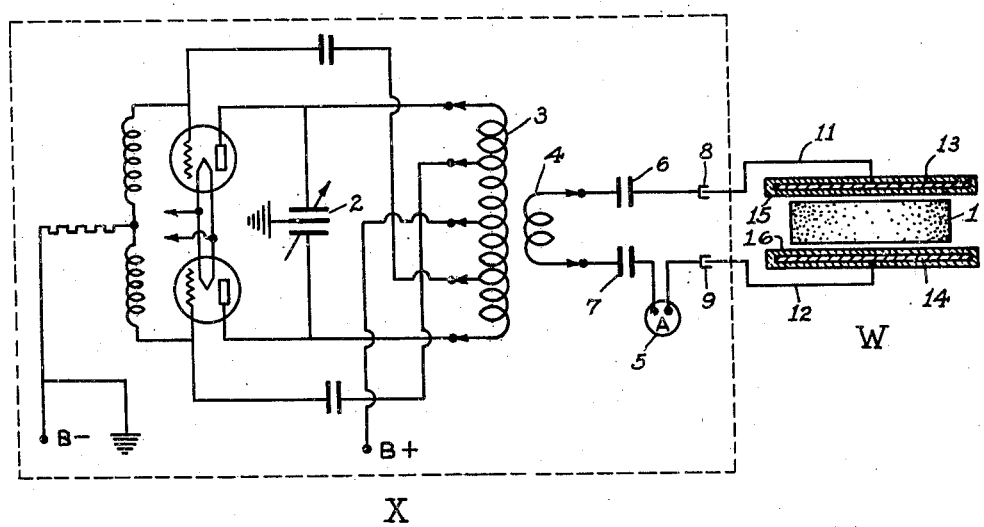
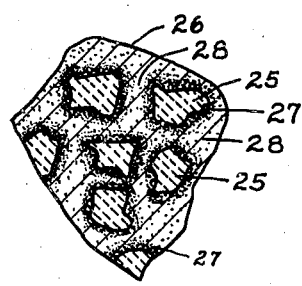
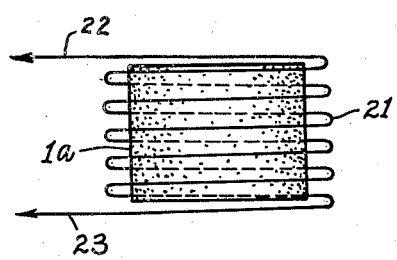
INVENTORS.
ROMIE L. MELTON
GEORGE L. CHAPMAN
BY
*R C Benner*
ATTORNEY.

UNITED STATES PATENT OFFICE 2,233,176

MANUFACTURE OF BONDED ABRASIVE ARTICLES

Romie L. Melton and George L. Chapman, Niagara Falls, N. Y., assignors to The Carborundum Company, Niagara Falls, N. Y., a corporation of Delaware Application March 28, 1940, Serial No. 326,453

17 Claims. (Cl. 51—298)

This invention relates to a method of heat treating bonded granular articles such as grinding wheels, sticks, rubs, dental points and other shapes, and especially to the curing of abrasive products bonded with low temperature curing binders such as synthetic resinous materials, rubber, shellac, and the like. More particularly, the invention relates to a method of inductively curing such products by the use of high frequency alternating current fields which induce currents into each individual abrasive granule, and to a lesser extent into the binder itself, to effect a cure of the bonded article. The invention also relates to the apparatus for carrying out such cures and the products made by such methods.

In the manufacture of abrasive articles utilizing organic binders such as shellac, rubber, liquid or powdered resinous binders and the like, it has been customary to prepare a mixture of the binder with the abrasive granules and subject this mixture to a long time cure at a relatively low temperature range. For example, an abrasive article made of abrasive granules and a binder composed of phenol formaldehyde resin in liquid or powdered form is placed in a mold and pressed. After pressing, it is placed in an oven and slowly raised to a temperature of 350° F. over a period of approximately 16 hours and held at this temperature for 4 hours, thus taking about 20 hours for the cure. In the manufacture of similar articles using rubber as the binding agent, the abrasive granules are mixed with the rubber and other ingredients by milling or by other suitable methods. The mix is then pressed in a mold to any desired shape and heated to approximately 300° F. for about 2 hours after which the shaped article may be removed from the mold and the cure continued in an oven at 300° F. for an additional 16 hours. These lengthy cures are required for articles as small as, for example, grinding wheels 8" in diameter by ½" in thickness. Larger articles often require even longer periods of time.

In either of the above methods of manufacture, it is necessary to apply the heat externally and to maintain such external temperature for a rather long time so as to permit the heat to gradually soak through the mixture of grain and bonding material and effect a thorough cure of the center portions of the article. Furthermore, the temperature must be raised to the curing point very slowly in order to prevent an overcuring of the surface portions of the article. Often, as a result of too rapid heating, the bond in the surface of the article is overcured. Such wheels must be discarded or else trimmed down to a smaller size in order to remove the layer of overcured bond. At best there is obtained a gradation of cure throughout the article with a resulting variation in grinding characteristics.

Another difficulty involves the dissipation of any volatile materials given off by the bonding agent during the curing process, this being particularly troublesome where solvents for the binder are used in conjunction with the bonding agent. When the article is cured by external heat the binder in the outer portions of the article is cured first and forms a skin or film through which it is necessary for the volatilized matter of the central portions to penetrate in order to escape. This often causes bloating of the bond, and produces a non-uniform product, which must be rejected.

We eliminate the above and many other attendant difficulties of curing low temperature maturing bonds, particularly of the organic type, by electrically inducing high frequency alternating currents into the individual abrasive granules, and also to a lesser degree into the bond itself. In accordance with the present invention an uncured abrasive article is placed within or passed through a high frequency alternating current field whereupon the individual abrasive grains of the article, and to a lesser extent the bond itself, act as a number of dielectric and/or conducting bodies in each of which high frequency induced currents are set up by reason of the dielectric hysteresis losses, thereby transforming a large amount of the electrical energy into thermal energy. By these high frequency induced currents and the thermal energy developed from them we have found that we can simultaneously heat each individual particle throughout the entire mass of the abrasive article so as to heat the mass uniformly to a desired temperature in a much shorter time than that which has been possible with methods heretofore used.

In carrying out our invention, we utilize a high frequency electrical oscillating circuit of a conventional design in which the frequency of oscillations may be in the region of from 10 to 50 megacycles. The frequency of the current employed depends, of course, upon the character and size of the abrasive grains and upon the type of the bond employed. For example, it has been found by experiment that silicon carbide particles can be heated at a lower frequency than aluminous oxide particles of the same grit size. As the size of the abrasive grain becomes greater it is desirable to decrease the frequency of the current in order to obtain maximum electrical efficiency. Great care must be taken in curing rubber bonded abrasives by the method of the present invention, since the vulcanization of rubber is an exothermic reaction, and the rubber bond, if too strongly heated, proceeds to develop by its own heat of reaction to a state of overcure. Therefore it is generally necessary, in curing rubber bonded masses by high frequency induced currents, to develop a very low initial heat in the grains. This may be done by changing the frequency of the oscillations, or by lowering the power input into the circuit, or by intermittently applying the high frequency current. In such intermittent application of high frequency power the duration of the "on" and "off" periods are regulated to give a desired curing schedule.

Our invention will be more readily understood by reference to the accompanying drawing in which:

Figure 1 shows diagrammatically a bonded abrasive article and high frequency electrical means for heating the article;

Figure 2 illustrates another method of producing a high frequency field; and

Figure 3 shows a section of a bonded abrasive article produced by the present invention.

Referring to the illustrated embodiment of the invention, there is means X for producing an oscillating electrical current of suitable frequency and means W for setting up a high frequency electrical field and supporting a bonded abrasive article within said field.

The means X, which provides a source of high frequency electrical power, may be of any conventional design such as used in ultra-high frequency radio work. The circuit shown in Figure 1 is by way of illustration, and is a push-pull Hartley system in which the grid excitation is more constant than in most ultra-high frequency oscillator circuits for various load impedances. This vacuum tube oscillator should be capable of delivering several kilowatts and is tuned through a given frequency range by means of the tuning condenser 2. The coils 3 and 4 are preferably of the plug-in type and several sets of such coils are provided so that a range of frequencies of from 10 to 50 megacycles, or higher, may be readily obtained. A radio frequency ammeter 5 is provided in the output circuit and serves to indicate the correct circuit adjustment as well as the current in the output or load circuit. Fixed condensers 6 and 7 have no effect on the performance of the circuit but protect the operator against high direct current voltages in case of an accidental short-circuit within the oscillator X.

The means W for heating a bonded abrasive article by a high frequency current comprises power cables 11 and 12, (which plug into the jacks 8 and 9 of the oscillator X) condenser electrodes 13 and 14, and the bonded abrasive article 1 to be heated. As a safety precaution for the operator, the condenser electrodes 13 and 14 may be encased in a sheath of electrically insulating material 15 and 16. This insulating sheath should be made of a suitable material such as Pyrex glass, ceramic material or soft rubber, which has low dielectric losses at the high frequencies employed.

In practicing our invention, abrasive grains and a suitable binder therefor are first mixed together and then compacted or molded into a desired size and shape. The formed article 1 is then placed between the plates 13 and 14, and so positioned that the sides of the article lie substantially parallel to but spaced apart from the condenser plates. An ultra-high frequency current is applied to the condenser plates by the oscillator X, and the frequency and intensity of such high frequency currents are adjusted to such values, depending upon the character and size of the abrasive grains and bonding material, that the article is uniformly heated throughout and raised to a temperature sufficiently high to cure the binder material and produce a firmly bonded abrasive article. The rate of heating of the article 1 is, of course, determined by the electrical energy supplied to the condenser plates, as indicated by the radio frequency ammeter 5. This energy is readily controlled by the tuning condenser 2 and the power input to the oscillating circuit through the plate supply terminals B— and B+. It is desirable that the load circuit be tuned to resonance at all times and the tuning condenser 2 should be adjusted to compensate for any changes in dielectric capacity of the article being cured. The point of resonance is indicated by the ammeter 5 and for maximum electrical efficiency the oscillator should be adjusted so that a maximum reading is obtained on the ammeter.

The formed article 1 may be moved into the high frequency electrical field setup between the electrodes 13 and 14 by means of a conveyor belt or other supporting means. Such conveyor would necessarily be of a low dielectric loss material.

While we have not specifically shown a mold for the formed article 1 it is to be understood that the article can be cured in a suitable mold of low dielectric loss material and also that pressure can be applied during the curing process, if so desired. We may also heat the mixture to the point of softening and while the mix is in such a state apply pressure to compact the mix to a desired density and then complete the cure of the resin bond.

The adjustment of the oscillator to maintain resonance can be made automatic by suitable automatic tuning means, not shown in the drawing but well known in the radio art. Such a device may comprise a motor drive for the variable condenser 2 and cooperating resonance indicator and electrical contactor or other similar arrangement.

Referring now to Figure 2, in which there is shown an alternative form of apparatus, the abrasive article 1a is placed within the high frequency electromagnetic field produced by the coil 21. This coil 21 may be connected to the source of high frequency power X, of Figure 1, by means of the cables 22 and 23. Heating of the article 1 is regulated by the controls on the oscillator, as described above. This method of inducing an ultra high frequency current into an abrasive article 1a is of particular value when the thickness of the article is substantial as compared to its diameter.

The following specific examples are given to illustrate the making of bonded abrasive articles embodying the present invention:

*Example I*

|  | Percent by weight |
|---|---|
| 40 grit fused alumina grain | 90 |
| Powdered heat hardenable phenol formaldehyde resin | 10 |

The abrasive grains were first wet with a resin solvent, such as furfural, and then mixed with the powdered uncured resin so that a surface coating of resin was applied to the individual grains and a uniform mixture of flowable resin coated granules, free of loose resin powder, was produced. The mix then was pressed in a mold at room temperature, under a pressure of 2000# per square inch, to form an abrasive wheel of any desired size, as for example 8" in diameter by ½" in thickness. The pressed wheel was removed from the mold and placed in a high frequency alternating current field operating at a frequency of 18 megacycles per second. Using an apparatus such as shown in Figure 1, the wheel was so positioned in the field that its flat sides were parallel but spaced from the condenser plates. Using a current input of 21.5 amperes, the wheel was heated for approximately 15 minutes, and upon cooling was found to be completely cured.

As the cure of the resin bond progresses the dielectric capacity of the wheel body changes. To take care of these changes and maintain the point of resonance and thereby obtain maximum heating efficiency the condenser 2 should be adjusted so that a maximum reading is always obtained on the ammeter 5.

Example II

|  | Parts by weight |
|---|---|
| 20 grit fused aluminous oxide grain | 33 |
| 24 grit fused aluminous oxide grain | 33 |
| Smoked sheet rubber | 6 |
| Sulphur | 3 |
| Whiting (as filler) | 25 |

The rubber was first plasticized on the milling rolls and then the abrasive grain, sulphur, and filler mixed into the rubber by slowly adding it to the plasticized rubber mass and passing the mixture through the rolls until it was homogeneous. The mass was then sheeted to the desired thickness, which in this instance was ½" thick, and discs of the sheet cut to the size required to fit the mold, which was 8" in diameter. The cut disc was then cold pressed in a mold under a pressure of 1000# per square inch. The pressed wheel was then placed in a high frequency alternating current field operating at a frequency of 10 megacycles per second. Using a current input of 18 amperes, the wheel was completely cured in approximately 25 minutes. Maximum heating efficiency was maintained in a manner similar to that described in connection with Example I.

The above examples are by way of illustration only and it is to be understood that other bonding materials, such as shellac, silicate, and various synthetic resinous materials may be used. Obviously the method of molding, the frequency of the current employed and the time of curing will vary with the particular bond and type and size of grain used.

The present process is also adaptable to the manufacture of wheels by the well known puddling process and also to a more recently developed cast process using rubber latex or other suitable liquid binders.

We have also found the present process of inductively heating abrasive granules to be particularly useful in the preparation of abrasive mixes in which a surface coating of various dry, non-tacky resinous bonding materials are applied to abrasive and other granular particles. In coating such particles we prepare a loose mixture of grains and a suitable bond of finely pulverized, fusible resin, such as shellac, a phenol formaldehyde, glyptal or vinyl resin. This mixture of grain and powdered resin is passed through a high frequency alternating current field by means of a suitable conveyor system. A high frequency electrical current is induced into each individual granular particle and the surface of each particle becomes heated by reason of the dielectric hysteresis losses. The heated surface of the granules causes the powdered resin in contact therewith to fuse or soften and become tacky and adhere to the heated surface. Thus it is possible to thoroughly and uniformly coat the surface of the individual grains with a layer of resin bonding material. By controlling the time of heating and the electrical power supplied it is possible to control the quantity of resin adhered to the granules and to build up a surface layer of any desired thickness. The resin coated grains are then molded to form an abrasive article of desired size and shape and then fully cured by the herein described method or by any other suitable heat treating methods.

While we have found the herein described process to be especially adaptable to low curing bonds, by suitably insulating abrasive and ceramic articles we can effect the maturing of ceramic vitrified bonds. The vitrified wheels likewise are heated uniformly throughout the entire mass of the article, thus very greatly reducing the tendency of such articles to crack due to non-uniform heating. This uniform heating is of particular importance in the initial stage of heating due to the fact that an appreciable quantity of water is generally added during the preparation of the grain-bond mixture and this moisture must be driven off. This initial heating step is in reality a drying operation and we have found that the herein described method of heating may be used to very great advantage in initially heating or drying other molded articles, such as ceramic ware, refractories, non-metallic electrical resistors, and the like. After this initial heat treatment the ceramic article may be further heat treated in the ordinary manner, if desired, or by subjection to the action of a high frequency field of increased intensity. The latter is preferred since simultaneous heating throughout very greatly reduces the curing time over that required in regular vitrifying kilns in which heat is applied externally to the article and allowed to gradually soak through the article.

The method of curing abrasive articles by high frequency heating has been found to be of particular value in the manufacture of bonded abrasive articles employing a heat-hardenable binding agent. Since the heat is produced in each individual abrasive particle, the curing of the bond begins at the surface of each particle and any solvent or other volatile matter present in the bond is more readily driven off inasmuch as it does not have to penetrate a surface film of partially cured bond, as in the case of cures effected by the application of external heat. Furthermore, the cure of such bond may be so controlled that it is more completely cured at the surface of the abrasive granules and less completely cured in the space between adjacent granules. This feature is illustrated in Figure 3 of the drawing which shows a section of a bonded abrasive article. The abrasive grains 25 are held together by the bond indicated generally by the reference character 26. While the abrasive article is uniformly cured from outside to the center, it will be noted that the bond 26, in this instance, is more completely cured adjacent the surface of the granules 25, as indicated by the reference numeral 27 and densely dotted area, and progressively less completely cured at increased distances from the grains, as indicated by the reference numeral 28 and the sparsely dotted areas. This gradation of cure and degree of hardness and/or brittleness of the bonding medium is important in that each individual particle is securely held in place by a film of completely cured bond while the remainder of the bond may be less cured and more flexible. Thus we are able to produce an abrasive article of greater flexibility and yet the individual grains are firmly encased in a sheath of completely cured bond. This is of particular importance in the manufacture of rubber bonded abrasive wheels, since considerable difficulty has been encountered in retaining the exposed cutting grains in their sockets in the rubber bond. Because of the elasticity of the rubber bond surrounding these grains, they tend to snap out of place and become dislodged long before their full cutting qualities have been utilized. Using the herein described process we have found that we can cure the rubber bond immediately adjacent to each individual grain to the stage of hard rubber and thereby materially increase the holding power of the rubber bond. Such a shell of hard cured rubber surrounding each individual grain is not elastic and hence does not deform under stress and permit the granule to be pulled out of its socket. Instead, the abrasive grains are held firmly in place until their effective lives are spent, and not until then are they released to create a new grinding surface. Furthermore, such a relatively thin shell of hard cured rubber around each granule does not materially reduce the resiliency and flexibility of the finished article.

Electrically conducting materials, such as metal powders, graphite, and similar fillers, may be incorporated in the bonding medium so as to increase the quantity of electrical energy induced into the bond and the heat produced therein. Thus we are able to regulate the relative quantity of heat produced in the granular particles and in the bond itself and thereby control the degree of cure of the bond between the abrasive particles with respect to that in close proximity to said particles. The conducting particles should be appreciably smaller than the abrasive particles used in the mixture and the quantity of such material used will depend upon the particular bond, grain size and desired characteristics of the finished article.

In previous methods of curing by externally applied heat, the outer portions of the article being cured are necessarily subjected to more heat than required to bring about the desired cure in order that sufficient heat will penetrate and cure the interior portions of the article. It has been necessary to lessen this fault by bringing the articles up to curing temperature at a very slow rate, thereby increasing costs of curing considerably. At best, the articles were not uniformly cured from the outer surface to the center. In the present method of curing by high frequency induced currents the article is heated simultaneously throughout, thereby subjecting all portions of the object to the same amount of heat and obtaining an article of greater uniformity. This increased uniformity gives a wheel of more even and better predictable grinding action and permits of greater control over the grade of the wheel.

While the method and apparatus has been described as employed in the manufacture of bonded abrasive articles, the invention is not so limited and covers the bonding together of other granular materials which may be heated by means of high frequency currents.

Other advantages and forms of apparatus will be apparent from the foregoing disclosure to those skilled in the art, and while specific embodiments have been used to illustrate our invention, it is to be understood that the invention is not limited to those embodiments, but is defined by the appended claims.

We claim:

1. The method of manufacturing bonded abrasive articles which comprises placing abrasive grains and a heat maturable binder therefor in a high frequency alternating current field and causing said high frequency current to heat the individual grains to a temperature sufficient to mature said binder.

2. The method of manufacturing bonded abrasive articles which comprises placing abrasive grains and a heat maturable binder therefor in a high frequency alternating current electrostatic field and causing high frequency currents to be produced in the individual abrasive grains, whereby said grains are individually heated to a temperature sufficient to mature said binder.

3. The method of manufacturing bonded abrasive articles which comprises placing abrasive grains and a heat maturable binder therefor in a high frequency alternating current electromagnetic field and causing high frequency currents to be induced into the individual abrasive grains, whereby said grains are individually heated to a temperature sufficient to mature said binder.

4. The method of manufacturing bonded abrasive articles which comprises placing abrasive grains and a heat maturable binder therefor in a high frequency alternating current field, said frequency being of the order of 10 to 50 magacycles, and causing high frequency currents to be simultaneously produced in each individual grain, whereby said grains are heated to a temperature sufficient to mature said binder.

5. The method of manufacturing bonded abrasive articles which comprises placing abrasive grains and a heat maturable binder therefor in a high frequency alternating current field and simultaneously inducing a high frequency current into substantially all of said individual abrasive grains, said high frequency electrical energy being transformed to thermal energy by the dielectric losses produced within the abrasive grains whereby said grains are heated to a temperature sufficient to mature said binder.

6. The method of manufacturing bonded abrasive articles which comprises placing abrasive grains and a heat maturable binder therefor in a high frequency alternating current field, simultaneously inducing a current into substantially all of said individual abrasive grains, and transforming the high frequency electrical energy to thermal energy by means of the dielectric losses and eddy currents produced within and around the abrasive grains and thereby heating each of said grains to a temperature sufficient to mature said binder.

7. The method of manufacturing bonded abrasive articles which includes the step of placing a loose mixture of abrasive grains and a non-metallic fusible binder therefor in a high frequency alternating current field, whereby the individual granules are electrically heated and the fusible binder caused to adhere thereto.

8. The method of manufacturing abrasive articles such as wheels, sticks and the like, which comprises the steps of preparing a mixture of abrasive grains and a heat maturable binder therefor, molding said mixture to the desired shape and size, placing the molded article in a high frequency alternating current field and curing the said binder by means of said high frequency alternating current field which heats the individual grains by induced high frequency currents to a temperature sufficient to mature said binder.

9. The method of manufacturing bonded abrasive articles which comprises the steps of preparing a mixture of abrasive grains and a heat hardenable phenol formaldehyde resin, molding said mixture to a desired shape and size, placing the molded article in a high frequency alternating current field and producing high frequency currents in the individual abrasive grains, whereby said grains and resin are heated to a temperature sufficient to bond together and to cure said phenol formaldehyde resin.

10. The method of manufacturing bonded abrasive articles which comprises the steps of preparing a mixture of abrasive grains, rubber binder and a vulcanizing agent, forming said mixture in a desired shape and size, placing the shaped article in a high frequency alternating current field and producing high frequency currents in the individual abrasive grains, whereby said grains and rubber binder are heated to a temperature sufficient to bond together and to cure said rubber binder.

11. The method of manufacturing bonded granular articles which comprises preparing a mixture of granular particles and a ceramic bond therefor, molding said mixture to a desired size and shape, placing the molded article in a high frequency alternating current field and causing high frequency currents to be produced in the individual granular particles, whereby said particles and bond are heated to a temperature sufficient to become bonded together.

12. The method of manufacturing bonded granular articles which comprises preparing a mixture of granular particles, a heat maturable bond and a volatile plasticizer therefor, molding said mixture to a desired shape and size, placing the molded article in a high frequency alternating current field and causing high frequency alternating currents to be produced in the individual granular particles, whereby said mixture is heated uniformly to a temperature sufficient to drive off said volatile material, after which said mixture is further heated to a temperature sufficient to mature said bond.

13. The method of manufacturing bonded granular articles which comprises preparing a mixture of granular particles, a heat maturable bond and finely divided electrically conducting particles, molding said mixture to a desired size and shape, placing the molded article in a high frequency alternating current field and causing high frequency alternating currents to be produced simultaneously in both the individual granular particles and the electrically conducting particles, whereby the said mixture is heated throughout and the bond uniformly heated to a temperature sufficient to produce a coherent mass.

14. The method of manufacturing bonded abrasive articles comprising the steps of placing a loose mixture of abrasive grains and a non-metallic fusible bond therefor in a high frequency alternating current field, whereby the individual granules are electrically heated and the fusible bond caused to adhere and form a surface coating thereon, molding said bond coated grains to a desired shape and size, placing the molded article in a high frequency alternating current field and causing additional high frequency alternating currents to be produced in the individual grains, which further heats said grains to a temperature sufficient to mature said bond.

15. The method of manufacturing bonded abrasive articles which comprises preparing a mixture of abrasive grains and a heat hardenable resin binder therefor, molding said mixture to a desired shape and size, placing the molded article in a high frequency alternating current field, causing high frequency alternating currents to be produced in the individual abrasive grains to electrically heat said grains and so controlling the said high frequency currents that the resin binder will be substantially completely cured at points adjacent the surfaces of the abrasive grains and progressively decreasing in degree of cure at increasing distances from each individual grain.

16. A bonded abrasive article comprising abrasive granules and an organic bond for adhering said granules into a coherent mass, said bond being substantially completely cured at points adjacent the surfaces of the abrasive granules and progressively decreasing in degree of cure at increasing distances from each individual abrasive grain.

17. A bonded abrasive article comprising abrasive granules and an organic bond for adhering said granules into a coherent mass, each of said individual granules being substantially completely surrounded by a layer of substantially completely cured and relatively rigid bond, the remaining portion of the said bond, connecting the individual granules, being in a partially cured and more flexible state.

ROMIE L. MELTON.
GEORGE L. CHAPMAN.